United States Patent
Yu et al.

(10) Patent No.: US 8,471,813 B2
(45) Date of Patent: Jun. 25, 2013

(54) HANDHELD ELECTRONIC DEVICE AND FUNCTION CONTROL METHOD THEREOF

(75) Inventors: Qi-Long Yu, Shenzhen (CN); Jun Zhang, Shenzhen (CN)

(73) Assignees: Fu Tai Hua Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 250 days.

(21) Appl. No.: 13/151,284

(22) Filed: Jun. 2, 2011

(65) Prior Publication Data

US 2012/0212403 A1  Aug. 23, 2012

(30) Foreign Application Priority Data

Feb. 18, 2011 (CN) .......................... 2011 1 0040408

(51) Int. Cl.
*G06F 3/033* (2006.01)
(52) U.S. Cl.
USPC .......................................................... 345/158
(58) Field of Classification Search
USPC .................... 345/156–173; 607/116
See application file for complete search history.

(56) References Cited

U.S. PATENT DOCUMENTS

2008/0062134 A1* 3/2008 Duarte et al. ................. 345/169

* cited by examiner

*Primary Examiner* — Kevin M Nguyen
*Assistant Examiner* — Kenneth B Lee, Jr.
(74) *Attorney, Agent, or Firm* — Altis Law Group, Inc.

(57) ABSTRACT

A handheld electronic device is provided. The electronic device includes an electrode unit, a storage unit, and a processing unit. The electrode unit includes a main body defining an annular cavity, a plurality of electrode groups, and a conductive element arranged within the annular cavity, wherein each of the plurality of the electrode groups includes a pair of conductive sheets, which are partially received in the annular cavity and are spaced apart from each other. When the electronic device is rotated to be in different orientation, the conductive element connects different electrode groups and the conductive sheets of the one of the electrode groups are connected to each other via the conductive element. The processing unit determines the connected electrode groups and executes a function corresponding to the determined electrode group. A function control method of the handheld electronic device is also provided.

6 Claims, 5 Drawing Sheets

HANDHELD ELECTRONIC DEVICE AND FUNCTION CONTROL METHOD THEREOF

BACKGROUND

1. Technical Field

The present disclosure relates to electronic devices, and particularly, to a handheld electronic device and a method for controlling the handheld device.

2. Description of Related Art

Keyboards, touch pads, and touch screens are widely used for inputting commands to electronic devices. A keyboard often takes up a relatively larger space of an electronic device. Touch pads and touch screens are relatively expensive. Therefore, a new manner for users to input commands to electronic devices is needed to solve the above mentioned problems.

BRIEF DESCRIPTION OF THE DRAWINGS

Many aspects of the present disclosure should be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Embodiments of the present disclosure will now be described in detail below, with reference to the accompanying drawings.

Figure 1:
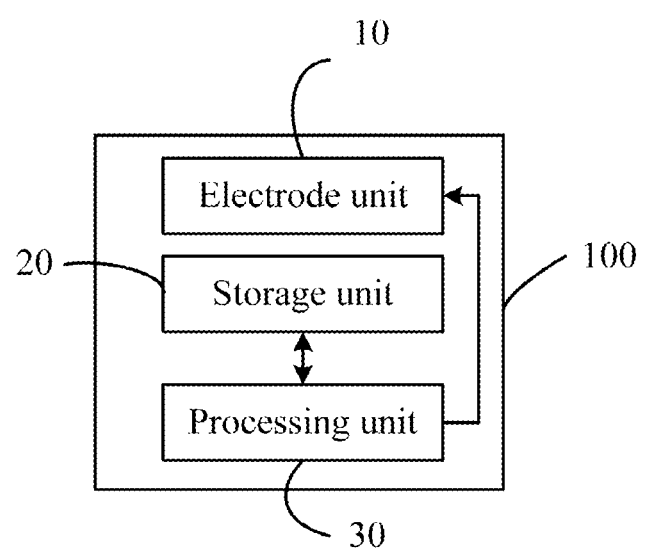
FIG. 1 is a block diagram of a handheld electronic device in accordance with an exemplary embodiment.
Figure 2:
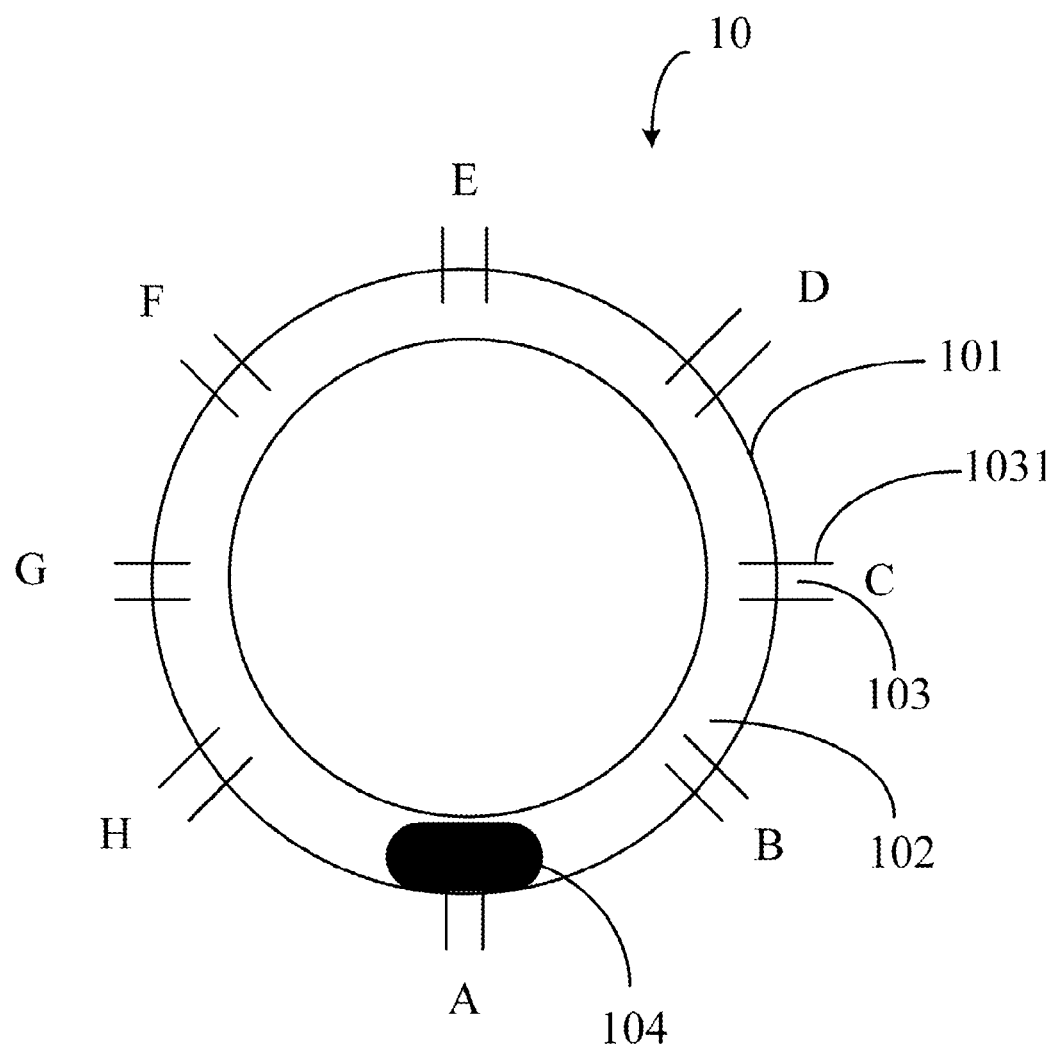
FIG. 2 is a schematic view of an electrode unit of the electronic device of FIG. 1.

Referring to FIGS. 1-2, a handheld electronic device 100 includes an electrode unit 10, a storage unit 20, and a processing unit 30 electrically connected to the electrode unit 10 and the storage unit 20.

The electrode unit 10 is arranged inside the electronic device 100. In this embodiment, the electrode unit 10 is in a plane perpendicular to a surface of the electronic device 100 including a display (not shown). The electrode unit 10 includes a main body 101 defining an annular cavity 102, a number of electrode groups 103, and a conductive element 104 arranged within the annular cavity 102. Each electrode group 103 includes a pair of conductive sheets 1031, which are partially received in the annular cavity 102 and are spaced apart from each other, thus the resistance value between the two conductive sheets 1031 is infinite. The conductive element 104 can move along the annular cavity 102 when the electronic device 100 is rotated clockwise or anticlockwise. When the electronic device 100 is rotated to be in different orientations, the conductive element 104 moves to connect different electrode groups 103. When one electrode group 103 is contacted by the conductive element 104, the conductive sheets 1031 of the electrode group 103 are connected to each other via the conductive element 104. Thus, the resistance value between the two conductive sheets 1031 of the contacted electrode group 103 is proximately the sum of the resistance value of the conductive element 104 and the resistance value of the two electrode sheets 1031. In this embodiment, the main body 101 is insulative. The sums of the resistance value of conductive sheets 1031 of the electrode groups 103 are different from each other. The conductive element 104 is mercury.

In this embodiment, the storage unit 20 stores a relationship between the functions of the device 100 and the electrode groups 103 connected by the conductive element 104. The storage unit 20 further stores a resistance table recording the resistance values of the conductive sheets 1031 of each electrode group 103 and the resistance value of the conductive element 104.

The processing unit 30 is configured to determine which one of the electrode group 103 is connected, determine a to-be-executed function according to the relationship and the determined electrode group 103, and control the device 100 to execute the determined function. In this embodiment, the processing unit 30 determines that one electrode group 103 is connected by the conductive element 104 when the resistance value of the electrode group 103 is changed from infinite value to a value recoded in the resistance table.

Figure 3A:
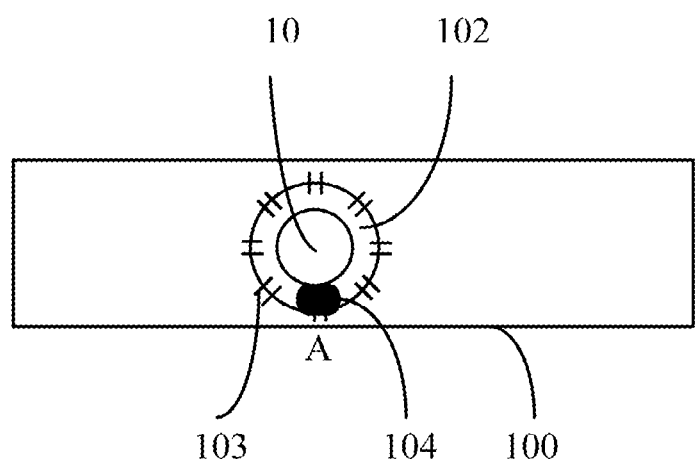
FIGS. 3A-3B are schematic views showing the handheld electronic device of FIG. 1 in a horizontal state and an inclined state.
Figure 3B:
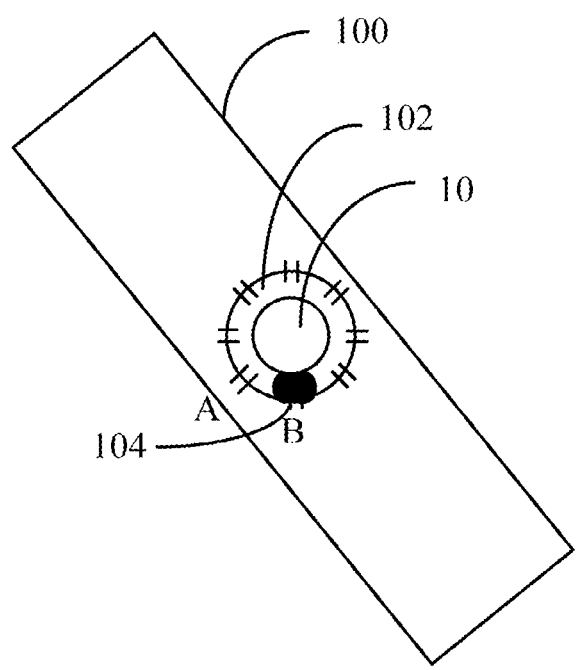

FIGS. 3A-3B are taken as an example to illustrate how to control the electronic device 100 to execute different functions via rotating the electronic device 100.

In this embodiment, the device 100 defines the electrode group A corresponding to a function of turning off a display (not shown) of the device 100 and the electrode group B corresponding to a function of turning on the display of the device 100. When the electronic device 100 is in a horizontal state, the electrode group A is connected by the conductive element 104 and the two conductive sheets 1031 of the electrode group A are connected to each other. When the processing unit 30 determines that the electrode group A is connected by the conductive element 104, and turns off the display. When the electronic device 100 is in an inclined state, the electrode group B is connected by the conductive element 104 and the two conductive sheets 1031 of the electrode group B are connected. The processing unit 30 determines the electrode group B is connected by the conductive element 104 and turns on the display.

Figure 4:
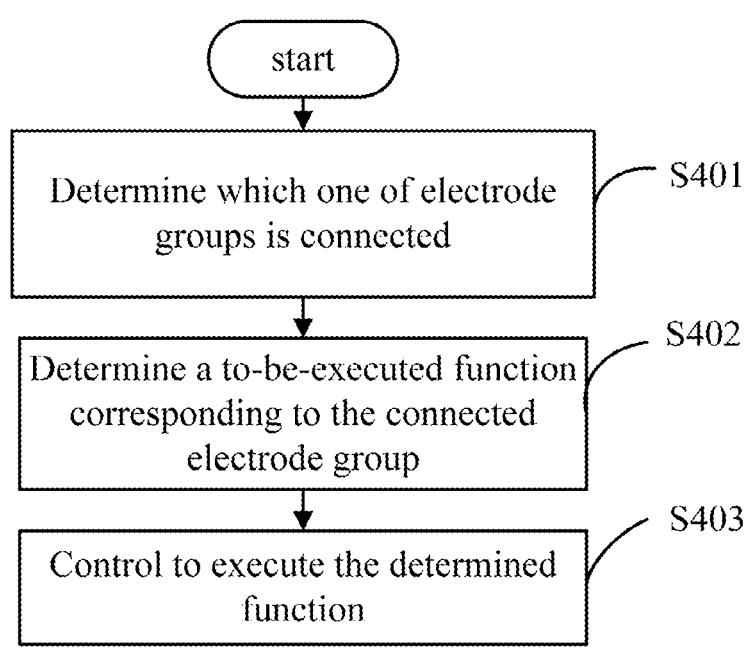
FIG. 4 is a flowchart of a function control method of the electronic device FIG. 1, in accordance with an exemplary embodiment.

FIG. 4 is a flowchart of a function control method in accordance with an exemplary embodiment.

In step S401, the processing unit 30 determines which one of the electrode groups 103 is connected. In this embodiment, the processing unit 30 determines one electrode group 103 is connected by the conductive element 104 when the resistance value of the electrode group 103 is changed from infinite value to a value recorded in the resistance table.

In step S402, the processing unit 30 determines a to-be-executed function according to the relationship and the determined electrode group 103.

In step S403, the processing unit 30 controls the electronic device 100 to execute the determined function.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the present disclosure.

What is claimed is:

1. An electronic device comprising:
    an electrode unit comprising a main body defining an annular cavity, a plurality of electrode groups, and a conductive element arranged within the annular cavity, wherein, each of the plurality of the electrode groups comprises a pair of conductive sheets which are partially received in the annular cavity and are spaced apart from each other, the conductive element is capable of moving along the annular cavity when the electronic device is rotated; when the electronic device is rotated to be in different orientation, the conductive element is capable of connecting different electrode groups; and when the conductive element connects one of the electrode groups, the conductive sheets of the one of the electrode groups are connected to each other via the conductive element;

a storage unit configured for storing a relationship between functions of the device and the electrode groups connected by the conductive element; and a processing unit connected to the electrode unit, to determine which one of the electrode groups is connected, determine a to-be-executed function according to the relationship between functions of the device and the electrode groups connected by the conductive element and the determined electrode group, and control the electronic device to execute the determined function.

2. The electronic device as described in claim 1, wherein the storage unit further stores a resistance table recording the resistance values of the conductive sheets of each electrode group and the resistance value of the conductive element, the processing unit determines that one electrode group is connected by the conductive element when the resistance value of the electrode group is changed from infinite value to a value recorded in the resistance table.

3. The electronic device as described in claim 1, wherein the main body is insulative.

4. The electronic device as described in claim 1, wherein the conductive element is made of mercury.

5. A function control method of a handheld electronic device, the handheld electronic device comprising an electrode unit comprising a main body defining an annular cavity, a plurality of electrode groups, and a conductive element arranged within the annular cavity, wherein, each of the plurality of the electrode groups comprises a pair of conductive sheets which are partially received in the annular cavity and are spaced apart from each other, the conductive element is capable of moving along the annular cavity when the electronic device is rotated, when the electronic device is rotated to be in different orientation, the conductive element is capable of connecting different electrode groups; and when the conductive element connects one of the electrode groups, the conductive sheets of the one of the electrode groups are connected to each other via the conductive element; a storage unit configured for storing a relationship between functions of the device and the electrode groups connected by the conductive element; and a processing unit connected to the electrode unit, the method comprising:

the processing unit determining which one of the electrode groups is connected;

the processing unit determining a to-be-executed function according to the relationship between functions of the device and the electrode groups connected by the conductive element and the determined electrode group; and the processing unit controlling the electronic device to execute the determined function.

6. The function control method as described in claim 5, wherein the storage unit of the electronic device further stores a resistance table recording the resistance values of the conductive sheets of each electrode group and the resistance value of the conductive element, the step of the processing unit determining the conductive sheets of which of the electrode groups are connected to each other comprises:

the processing unit determining one electrode group is connected by the conductive element when the resistance value of the electrode group is changed from infinite value to a value recorded in the resistance table.

* * * * *